July 24, 1962 A. D. CORNELL 3,045,856
GAUGING AND ATTACHING APPARATUS
Filed March 26, 1959 7 Sheets-Sheet 4
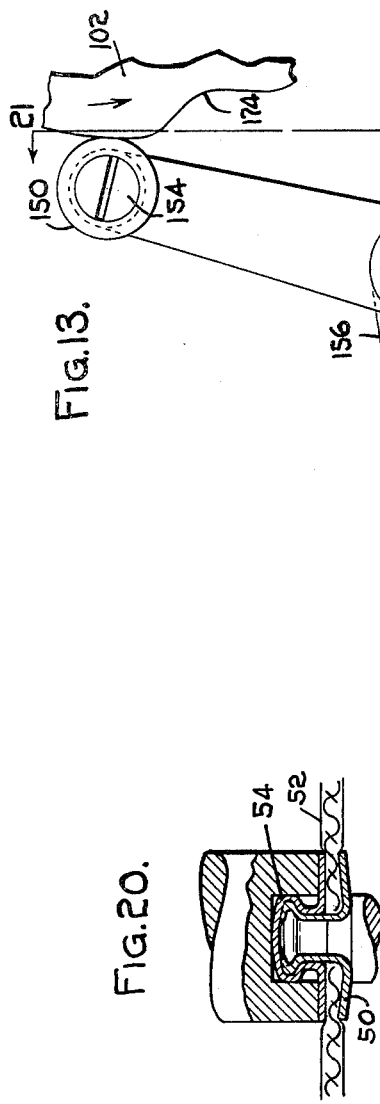
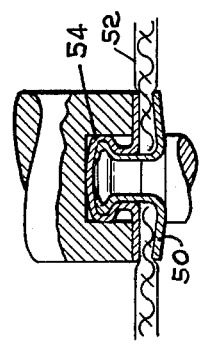
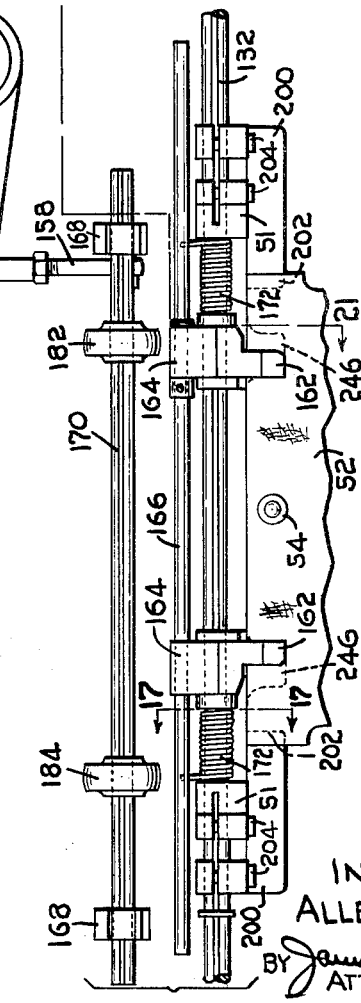
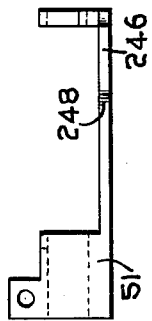
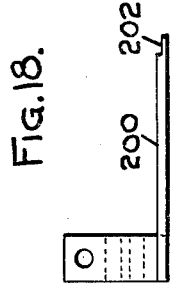
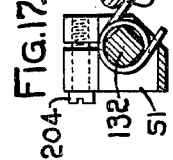
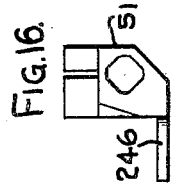
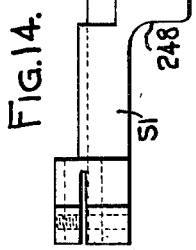
INVENTOR:
ALLEN D. CORNELL
BY James B. Tiffany Jr.
ATTORNEY.

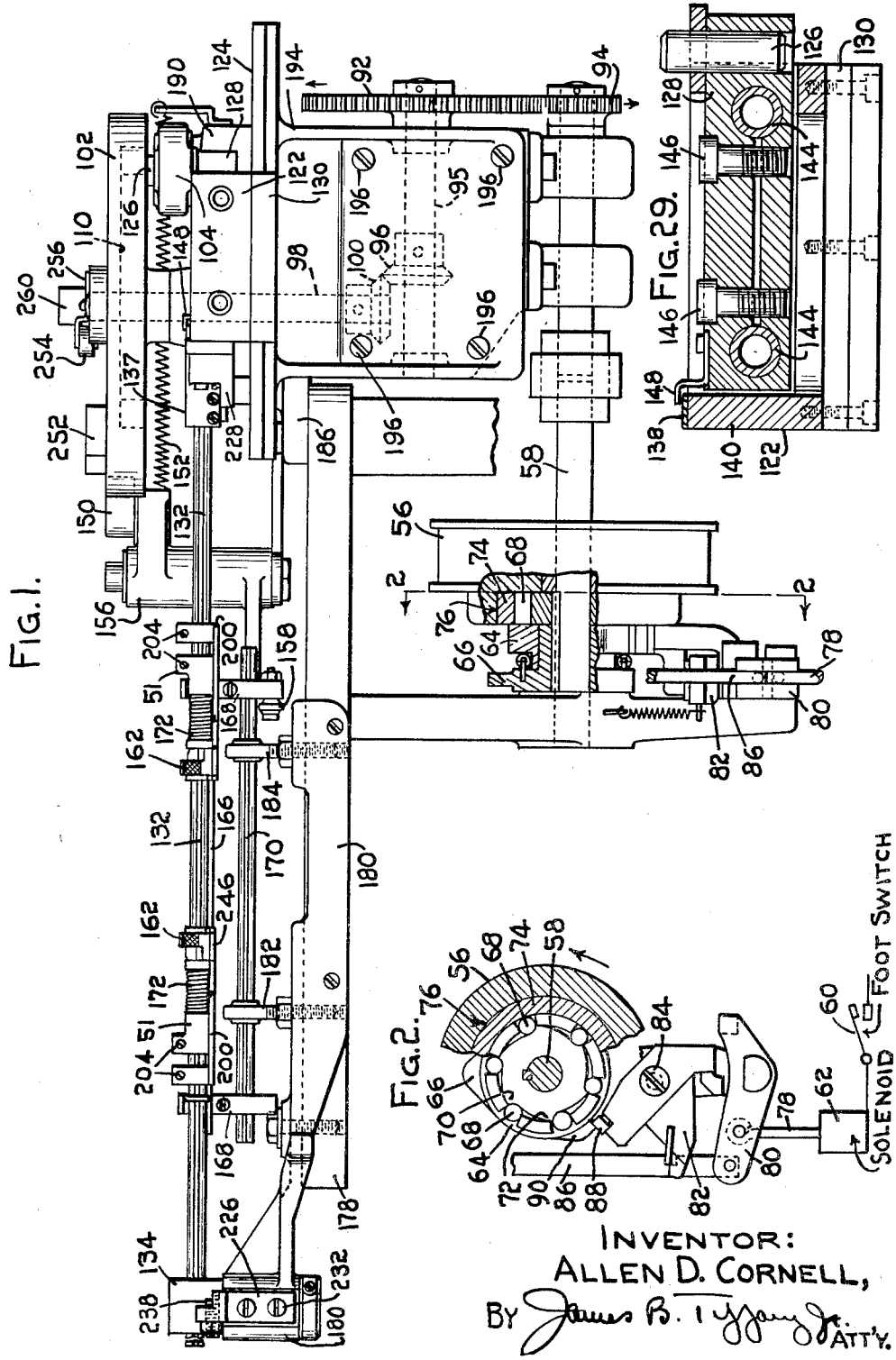

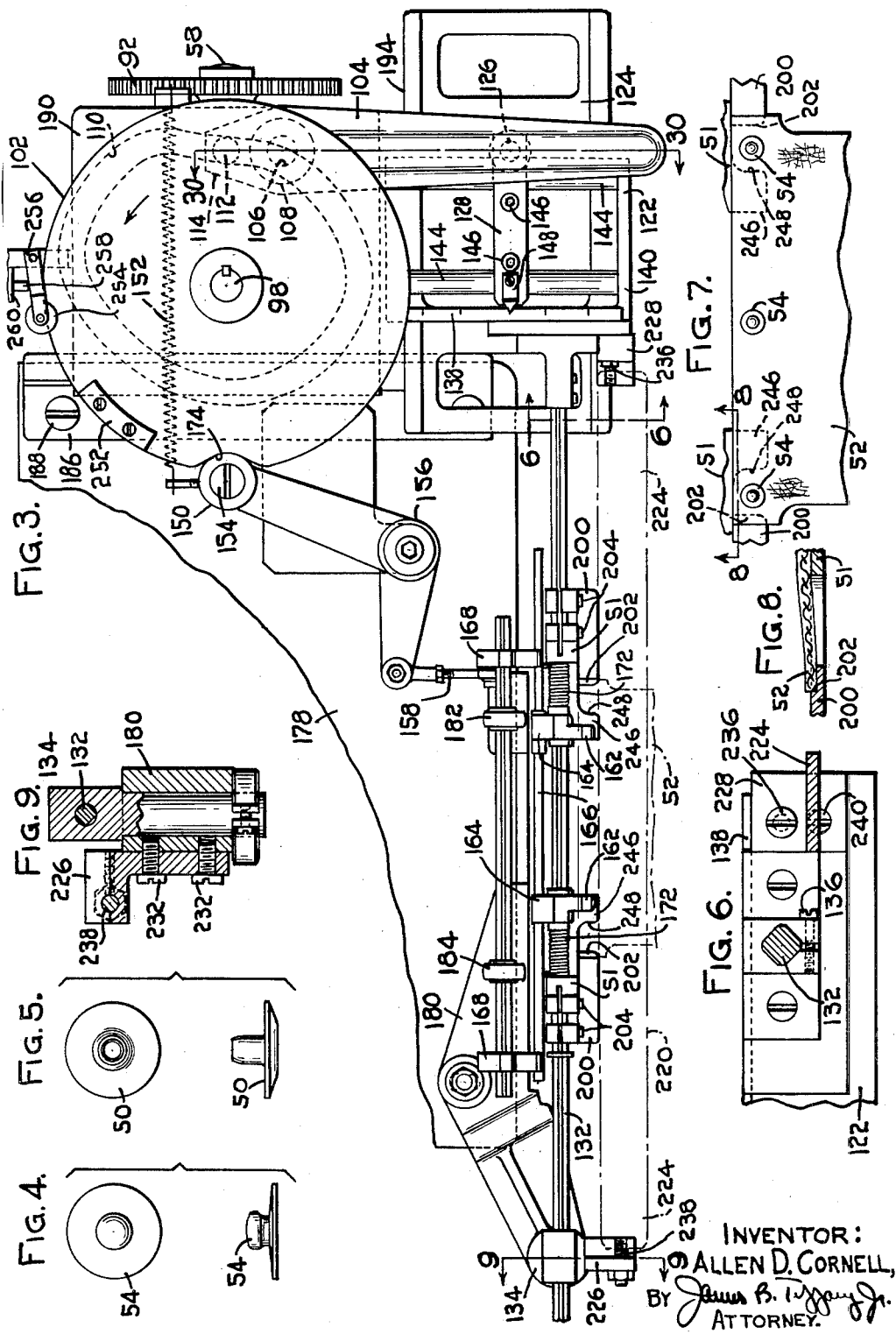

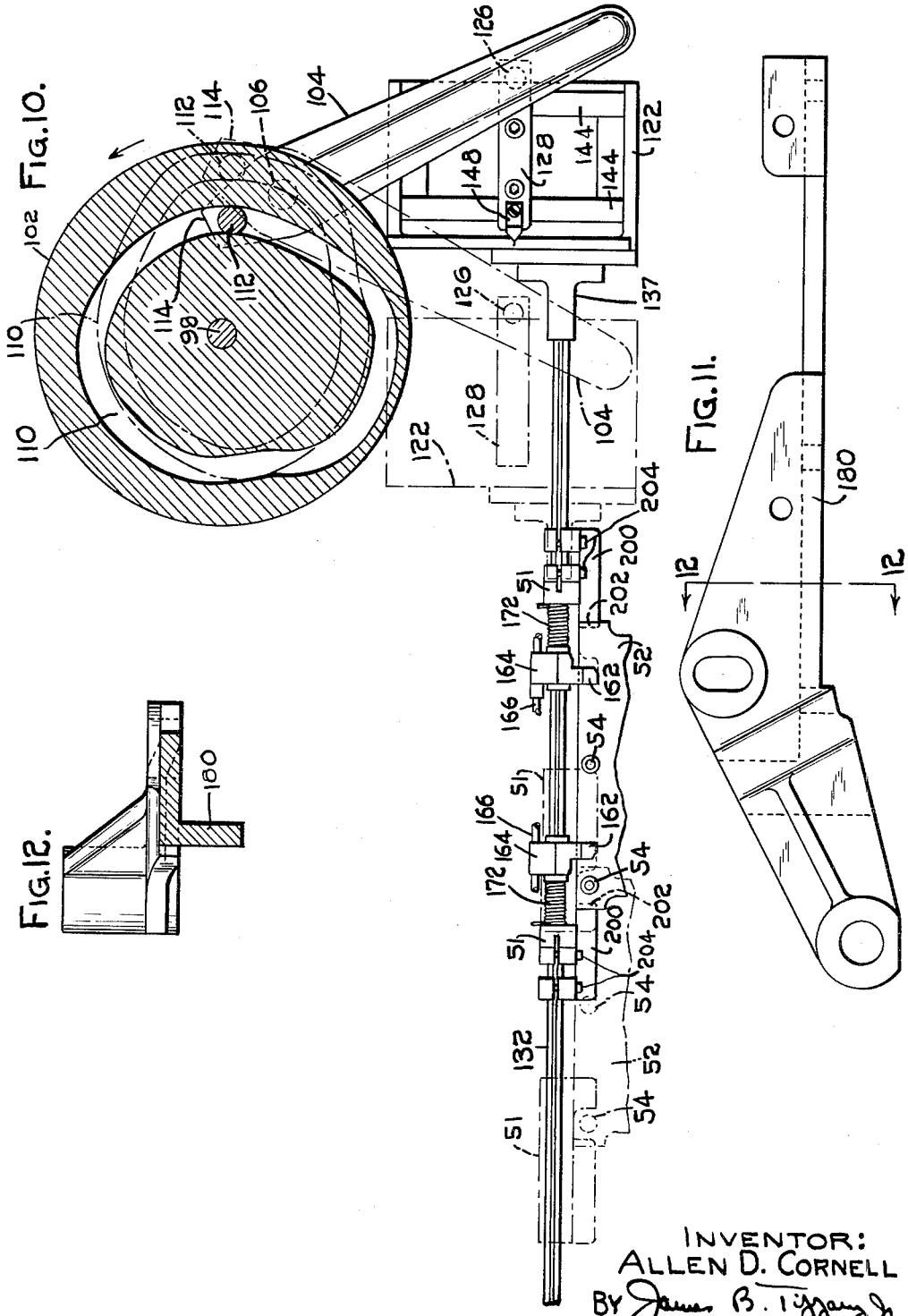

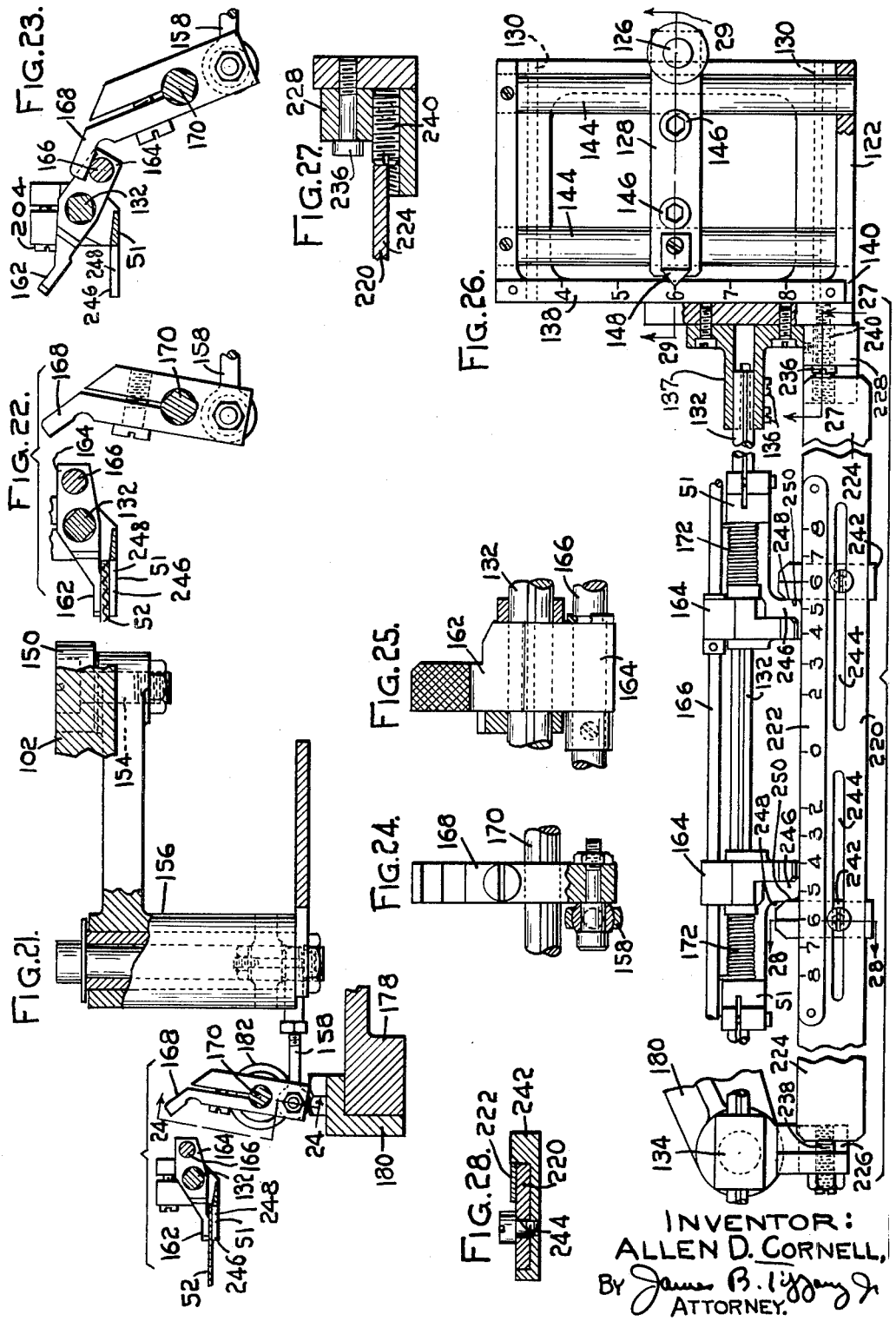

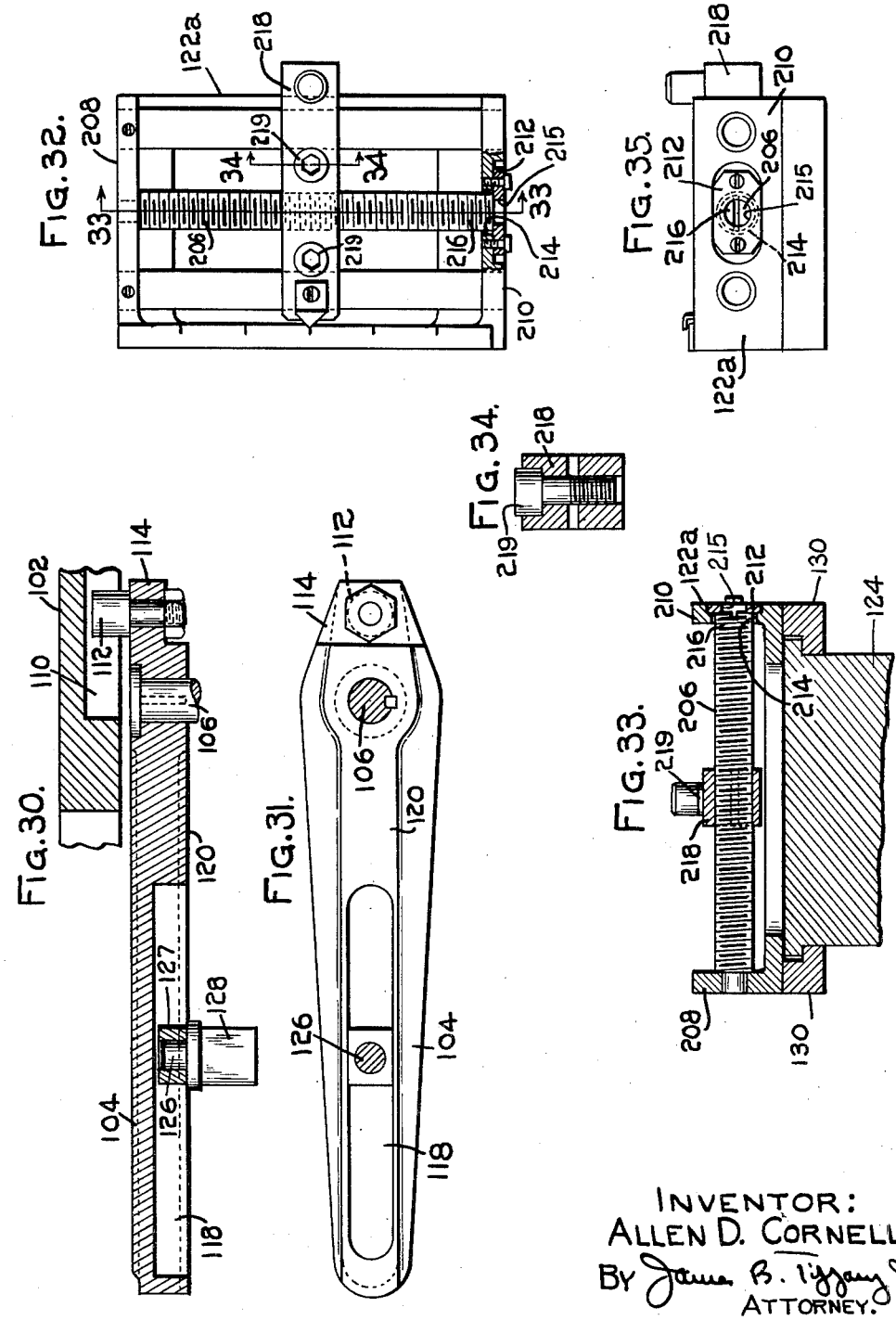

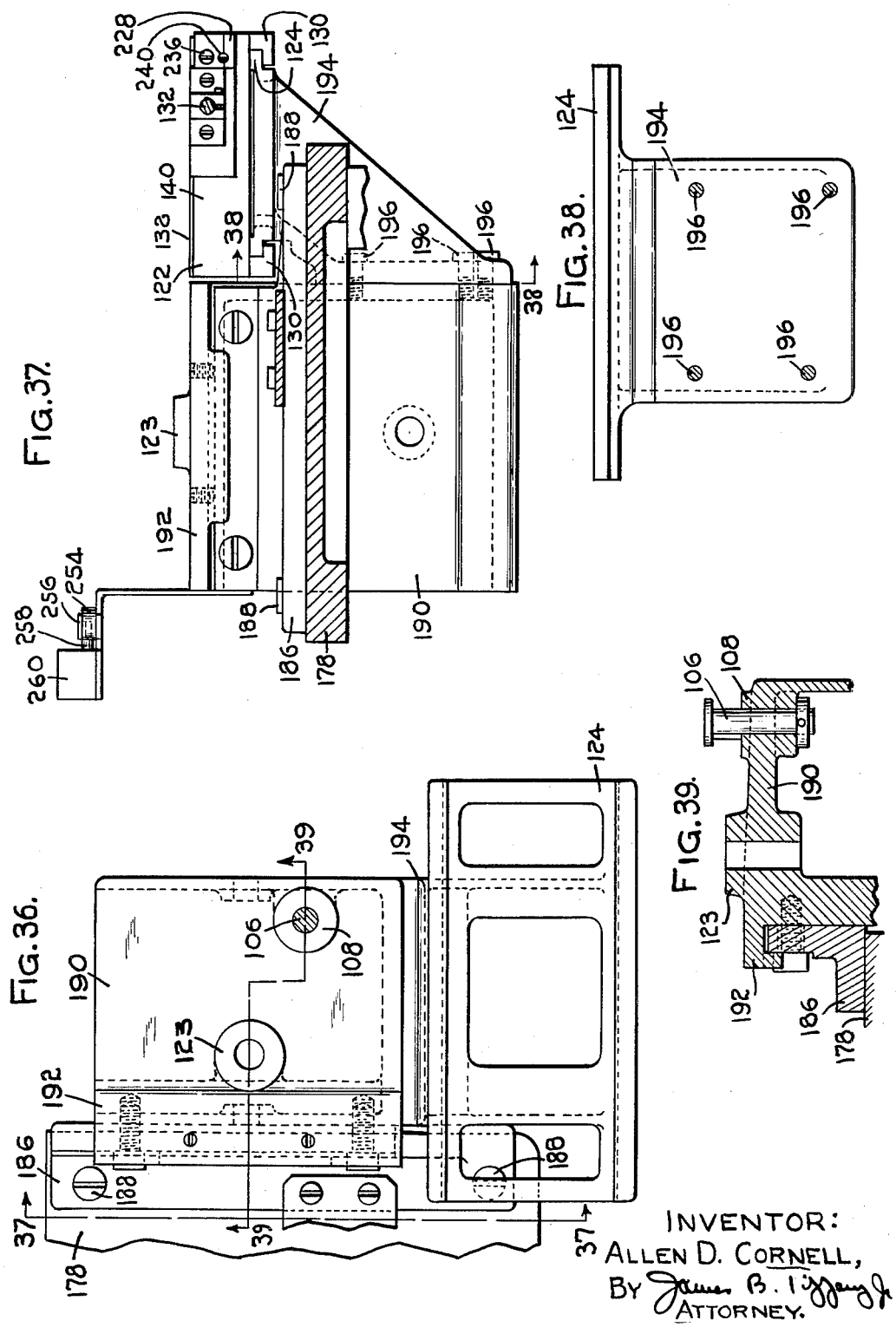

United States Patent Office 3,045,856
Patented July 24, 1962

3,045,856
GAUGING AND ATTACHING APPARATUS
Allen D. Cornell, Bedford, Mass., assignor to United-Carr Fastener Corporation, Cambridge, Mass., a corporation of Delaware
Filed Mar. 26, 1959, Ser. No. 802,228
3 Claims. (Cl. 218—6)

This invention relates generally to fastener attaching machines which automatically attaches a plurality of fasteners to a workpiece and more particularly to an adjustable gauging apparatus for predetermined spacing and sequence operation.

Heretofore in the attachment of fasteners to clothing or the like by automatic machinery difficulty has been experienced in establishing accuracy of fastener location due to an accumulation of tolerances within the attaching machine. These tolerances develop as a result of the complexity of the gauging apparatus which is used to determine the spacing of the fasteners on the work. A further disadvantage present in existing machines is the necessity of substituting cams when the need arises to change the spacing arrangement of the fasteners. The substitutions of machine parts make it essential to call a trained service man to replace the cams and destroys the versatility of the machine.

The object of the invention is to provide a fastener attaching machine which may be simply and easily adjusted for a varying number of fastener spacing settings.

Another object of this invention is to provide a fastener attaching machine which will accurately space a predetermined number of fasteners.

A further object of this invention is to provide an attaching machine having a synchronized work clamping structure with respect to the fastener spacing mechanism which enables the work to be carried through the operating cycle.

Other objects of this invention will, in part, be obvious, and will, in part, appear hereinafter.

In the drawings:

FIG. 1 is a view in front elevation of the attaching machine embodying the features of my invention;

FIG. 2 is a view in elevation, partly in section, taken on line 2—2 of FIG. 1;

FIG. 3 is a top plan view of FIG. 1 with the setting gauge and work appearing in dot and dash lines;

FIG. 4 is a view in plan and front elevation of a typical fastener stud for use with the machine;

FIG. 5 is a view in plan and front elevation of a typical fastener eyelet which is used with the machine;

FIG. 6 is a view in section taken on line 6—6 of FIG. 3 illustrating one portion of the gauging mechanism in elevation;

FIG. 7 is a top plan view of the work after the fasteners have been attached thereto;

FIG. 8 is a view in section taken on line 8—8 of FIG. 7 showing the work positioned against a stop member;

FIG. 9 is a view in section taken on line 9—9 of FIG. 3 illustrating an attachment of a bearing block and support to an adjustable bracket;

FIG. 10 is a plan view, partly in section depicting the position of the actuating cams when the second fastener in the operating sequence is set with the positioning of the third fastener setting indicated by the dot and dash lines;

FIG. 11 is a plan view of a supporting bracket;

FIG. 12 is a view in section taken on line 12—12 of FIG. 11;

FIG. 13 is a plan view of the actuating linkage and clamp mechanism in the clamping position;

FIG. 14 is a plan view of the left hand sliding block;

FIG. 15 is a view in front elevation of the left hand sliding block;

FIG. 16 is an end view of the block as shown in FIG. 15;

FIG. 17 is a view in section taken on line 17—17 of FIG. 13 showing the left hand sliding block with the spring normally in tension;

FIG. 18 is a view in front elevation of the adjustable gauge;

FIG. 19 is an end view of the gauge of FIG. 18;

FIG. 20 is a view in elevation, partly in section showing the stud and eyelet attached to the work;

FIG. 21 is a view in section taken on line 21—21 of FIG. 13 showing the linkage and the fingers in the clamped position;

FIG. 22 is an enlarged view of the work clamping fingers in engagement with the work;

FIG. 23 is an enlarged view of the work clamping fingers similar to FIG. 22 showing the fingers in the unclamped position;

FIG. 24 is a view partly in section, taken on line 24—24 of FIG. 21;

FIG. 25 is a bottom plan view partly in section of a clamping finger;

FIG. 26 is a top plan view broken away and partly in section illustrating the relative position of the setting gauge and the adjusting gauge;

FIG. 27 is a view in section taken on line 27—27 of FIG. 26 showing the stop member for the gauge to facilitate central alignment;

FIG. 28 is a view in section taken on line 28—28 of FIG. 26 illustrating the variable indicator of the setting gauge;

FIG. 29 is a view in section taken on line 29—29 of FIG. 26 showing the clamping mechanism of the adjustable gauge;

FIG. 30 is a view in section taken on line 30—30 of FIG. 3 illustrating the actuating cam lever;

FIG. 31 is a bottom plan view of the cam lever of FIG. 30 partly in section illustrating the adjustable block at the mid-point of the sliding block;

FIG. 32 is a top plan view of a modified form of the adjustable gauge mounted within the slide;

FIG. 33 is a view in section taken on line 33—33 of 32, showing the adjusting screw;

FIG. 34 is a view in section taken on line 34—34 of FIG. 32 showing the clamping stud;

FIG. 35 is a view in front elevation of the slide;

FIG. 36 is a top plan view of the supporting frame of the gauging and slide mechanism;

FIG. 37 is a view in section taken on line 37—37 of FIG. 36 with the slide and supporting frame in elevation;

FIG. 38 is a view in section taken on line 38—38 of FIG. 37; and

FIG. 39 is a view in section taken on line 39—39 of FIG. 36.

The end result of the attaching machine is as shown in FIG. 20 with an eyelet 50 piercing the workpiece 52 and entering into deformed engagement with a stud 54. It will be readily understood that the form of an automatic attaching machine can be adapted to set a variety of fasteners into various types of material but for the purpose of simplification and knowing this to be the preferred form only, one example has been shown.

The basic prime mover for the machine is a motor (not shown) which in the usual manner, as illustrated in FIG. 1, drives a belt rotating a flywheel 56 which is keyed to a main drive shaft 58. The operator starts the machine by depressing a foot switch 60 as shown in FIG. 2, energizing the solenoid 62 directly which in turn establishes an electro-mechanical connection to a standard Horton clutch. This clutch operates in the conventional manner in that a clutch ring 64 is mounted to turn loosely on a cam member 66 which is in turn keyed to the drive shaft 58. A plurality of rollers 68 are spring tensioned in the clutch ring 64, providing bearing surfaces to allow the ring to turn from a low position 70 to high point 72, allowing a hardened ring 74 to lock the clutch 76 to the flywheel 56. By energizing the solenoid 62 the linkage arm 78 is lowered and by means of a link 80 and suitable linkage 82, pivoted at 84 and connected to a link 86 permits the stop 88 to become disengaged from a lug 90 allowing rotation of the clutch ring 64.

The mechanism of the upper and lower setting tools (partially shown in FIG. 20) has not been illustrated in detail because it may be of any suitable construction such as the type set forth in the United States patent to Pickering, Number 2,645,374.

The mechanism of the invention (FIG. 1) is for transmitting a straight line motion for a predetermined fastener space setting within the limitations of the mechanisms in connection with attaching snap fastener members to garments and the like. This straight line motion, to work carriers 51, in synchronous relation to a fastener setting machine is from a driving gear 94 (FIG. 1) carried by the drive shaft 58 and geared to a drive gear 92 rotating a shaft 95 which in turn rotates the bevel gears 96 and 100. In this manner a rotating spindle 98 mounted in a bearing portion 123 (FIG. 36) is rotated. A face cam 102 is keyed to a spindle 98 and so proportioned that each rotation of the driven gear 92 causes a complete revolution of the face cam 102.

An actuating lever 104 (FIGS. 10, 30 and 39) is pivoted on a fulcrum 106 in turn carried in a bearing portion 108 (FIG. 39) of a mounting structure 190. This lever 104 is operated by the cam path 110 (FIG. 10) by means of a roller 112 permanently anchored at a terminal end 114 of the lever 104. It will be noted that the lever 104 has a groove 118 formed in its under surface (FIGS. 30 and 31) for a purpose to be described hereafter. A sliding block 122 (FIGS. 3 and 33) is supported upon a guide means 124 and held in place by gibs 130 as best shown in FIG. 33. This block 122 slides along the guide means 124 and is operated by movement of the lever 104 connected to the block 122 by means of a pin 126 and sliding block 127 (FIGS. 1, 10, 30 and 31) carried by an adjustable clamp member 128. The adjustable clamp member is mounted upon two rods 144 (FIGS. 10, 26 and 29) in turn suitably mounted upon the sliding block 122.

A transverse rod 132 is connected to the sliding block 122 (FIGS. 1, 10 and 26) and extends across the front of an attaching machine. One end of the rod 132 is secured by set screws 136 (FIG. 26) to the sliding block 122 through the medium of a bearing 137 and the other end of the rod is supported by a bearing 134 (FIG. 1).

A scale 138 (FIG. 26) is located on the left side portion 140 of the sliding block 122 under a pointer 148 on the cross head clamp 128. The cross head clamp 128 is adjustably slidable along the cylindrical rods 144, carried by the block 122, and is retained in position on the rods by bolts 146. By loosening the bolt 146, the cross head clamp 128 may be slid along the rods 144 to vary the position of the pin 126 in groove 118 in the lever 104 and hence to vary the travel of the sliding block 122.

A synchronous arrangement, as shown in FIG. 13, for clamping a work piece between the upper and lower setting tools of an attaching machine, is provided for actuation by the face cam 102 contacting with a roller 150. The roller 150 is mounted for engagement with the peripheral edge of the cam 102 (FIG. 3) and is maintained in contact therewith by means of a spring 152. This roller 150 rotates on a shouldered stud 154 connected to a bell crank 156 which gives reciprocating action to a push rod 158. The actual clamping mechanism shown in FIGS. 21, 22 and 23, consists of two adjustable work carriers 51 each having associated therewith a normally closed spring loaded finger 162 having rearwardly extending portion 164. The rear portions 164 carry an operating rod 166 which is actuated by two striker plates 168 clamped upon the transverse rod 170, one of the striker plates 168 being connected to one end of the push rod 158 to lift the fingers 162 away from the work carriers 51 to disengage the work piece 52, as shown in FIG. 23. The details of the carrier plates 51 are shown in FIGS. 14, 15 and 16. The upper fingers 162 are rotatably mounted upon the operating rod 132 and, as illustrated in FIG. 17, the coil spring 172 is constantly under tension to take care of variations in thicknesses of cloth or other material inserted between a carrier 51 and a finger 162.

A recess 174 is provided in the circumference of the face 102 (FIG. 3) and positioned to be opposite the roller 150 at the end of the fastener attaching cycle so as to allow the roller to rest therein. This action decreases the tension on the spring 172 thereby resulting in the fingers 162 opening and allowing the work to be easily disengaged.

The attaching machine (not shown) acts as the support for the base 178 (FIG. 3) which in turn supports the mechanism of the invention herein described. This base 178 supports the adjustable bracket 180 (FIG. 3) having bearings 182 and 184 (FIG. 1) in which the transverse rod 170 is mounted. An angle iron 186, or other suitable member (FIG. 1), is bolted to the base 178 (FIGS. 36 and 39) by means of bolts 188.

A mounting structure 190 in the form of a plate, supporting the face cam 102 and associated parts, is mounted upon the angle iron 186 and a second angle iron 194 is also bolted to the mounting structure 190 (FIGS. 1 and 3) by means of bolts 196 and the second angle iron 194 in turn supports the guide means 124 for the sliding block 122. The bearing portion 123 is formed in the mounting structure 190 (FIG. 36) for the rotating spindle 98.

Adjustable working positioning plates 200, each having a recess 202 (FIGS. 7, 8 and 18), receive and locate the edges of the work piece 52. These plates 200 may be moved laterally to accommodate work pieces 52 of varying widths and are clamped on rod 132 (FIGS. 1 and 3) by clamping screws 204.

A setting gauge 220 for the work piece 52 (FIGS. 3 and 26) includes a rule-like gauge member 222 and the ends 224 of the gauge member 220 are supported by blocks 226 and 228. The left-hand block 226 extends forwardly from the bracket 180 and is attached thereto by screws 232 (FIG. 9) and the right-hand block 228 extends from the sliding block 122 (FIG. 26) and is secured in place by screws 236 as best shown in FIG. 27.

With the gauge means described above, a setting may be made for a work piece with the scale set for zero marking and aligned with the center of an attaching machine. A locking screw 238 on the left-hand block 226 (FIG. 26) is adjusted to abut the end of the gauge member 220 and the same operation is followed with the locking screw 240 at the right-hand block 228 to abut the other end of the gauge 220. A pair of adjustable indicators 242 (FIG. 26), marked so as to indicate on the scale member 22, are movable in slots 244 in the member 220 and positioned at corresponding markings, as indicated in FIG. 26. The ends 246 of the work carrier 51 are now positioned so that an edge 248 on the left-hand end 246 abuts an edge 250 of the left-hand indicator 242 and an edge 248 of the right-hand end 246 abuts an edge 250 of the right-hand indicator 252. The apparatus is now positioned so that the work carrier 51 will lie within the path of the setting tools during the actual operation of the fastener attaching machine.

To set the adjustable clamp 128 (FIG. 26), the clamping screws 146 are loosened and the pin 126 adjusted along the rods 144 until the pointer 148 is set to the marking on the scale 138 corresponding to the similar mark on the linear scale 222. The clamping screws are then tightened to hold the adjustable clamp 128 in place as shown in FIG. 29. The machine is now set to automatically attach a plurality of fasteners a predetermined spaced distance from each other in a predetermined sequence and the setting gauge 220 may be removed.

To operate the above described mechanisms a work piece 52 is mounted in place and the mechanism is started. The initial rotation of the cam 102 operates the push rod 158 through the bell crank 156 allowing the striker plates 168, which are fixed on the shaft 170, to disengage the upper fingers 162 permitting those fingers to clamp the work 52 upon the work carrier 51 as best shown in FIG. 22. Simultaneously with the clamping of the work the middle fastener is set as shown in FIG. 13. Further rotation of the cam 102 transmits motion to the sliding block 122 carrying the work to the position shown in FIG. 10 and the second fastener is set at the extreme right-hand travel of the sliding block 122. The cam is then rotated further allowing the slide to move to the left, as shown in dotted and dash lines of FIG. 10, bringing the work in position for the setting of the third fastener.

As illustrated in FIG. 3, a cam member 252 is bolted to the upper surface of the positive acting face cam 102 and adapted to frictionally engage a spring loaded roller 254 connected by suitable lever 256 to a plunger 258. Upon completion of the attaching cycle the cam member 252 contacts the roller 254 thereby depressing the plunger 258 which in turn motivates a relay 260 breaking the electrical circuit of the machine (not shown) to the starting motor and stopping operation of the machine.

A modified form of the adjustable clamp is shown in FIGS. 32 to 35 where a threaded rod 206 is mounted between the end plates 208 and 210 of a sliding block 122A. The front end of the threaded rod 206 has a bearing in an aperture 214 in the end 210 of the block 122A and a thrust plate 212 with a central access upon 215 through which kerfed end 216 of the rod 206 can be adjusted. The adjustable clamp 218 may be moved along the transverse rods by loosening the clamping prongs 219 and by means of a screw driver rotating the threaded rod 206 which in turn cooperates with internal threads of the adjustable clamp 218.

Since certain other obvious modifications may be made in the devices described above without departing from the scope of the invention, it is intended that all matter contained herein be interpreted in an illustrative and not in a limiting sense.

I claim:
1. In a fastener attaching machine of the class described including at least one pair of opposed tools for setting fastener members, the combination of a work carrier adapted to shift the work intermittently between said opposed tools, said work carrier coupled to a guided slide block movable in a plane substantially perpendicular to the axis of said opposed tools, a crosshead positioned within said slide block having a pin free to travel within a slotted driving lever, said crosshead mounted to slide on a pair of spaced rods carried by the slide block and locking means securing said crosshead to said rods, said driving lever pivoted about a fulcrum and actuated by a positive acting face cam, whereby the amplitude of motion of said slide block is variable in relation to the distance of the pin on said crosshead from the fulcrum.

2. In a fastener attaching machine, mechanism for automatically positioning a workpiece between opposed fastener tools for setting a plurality of fasteners in a predetermined sequence, said mechanism comprising workpiece carrying means coupled to a rectilinearly guided reciprocating slide, a power driven face cam having a circuitous groove in one surface thereof, said slide including a pair of spaced rods having a laterally extending crosshead extending therebetween and means to secure said crosshead to said rods, a pivoted lever including a pin at one end adapted to travel in said circuitous groove, said lever having a longitudinal slot in one surface journalling a bearing on said slide, said bearing freely adjustable within said lever and carrying pin so as to vary the effective length of the lever.

3. In a fastener attaching machine, a mechanism for automatically positioning a workpiece between fastener attaching tools comprising in combination a prime mover actuated by a solenoid through clutch means to drive a vertical shaft, a positive acting face cam carried by said shaft having a circuitous groove on one surface thereof, a pivoted lever having one distal end journalled in said groove, a laterally moveable guided slide including a pair of spaced rods having an adjustable crosshead positioned therebetween, said crosshead carrying a single laterally movable pin journalled in a longitudinal slot in said lever whereby the amplitude of motion transmitted to said slide corresponds to the effective length of said lever.

References Cited in the file of this patent
UNITED STATES PATENTS

| | | |
|---|---|---|
| 961,830 | Zahn | June 21, 1910 |
| 1,592,060 | Wilcox | July 13, 1926 |
| 2,574,775 | Bechler | Nov. 13, 1951 |
| 2,645,374 | Pickering | July 14, 1953 |
| 2,646,185 | Huelster et al. | July 21, 1953 |
| 2,734,653 | Carpinella | Feb. 14, 1956 |